UNITED STATES PATENT OFFICE.

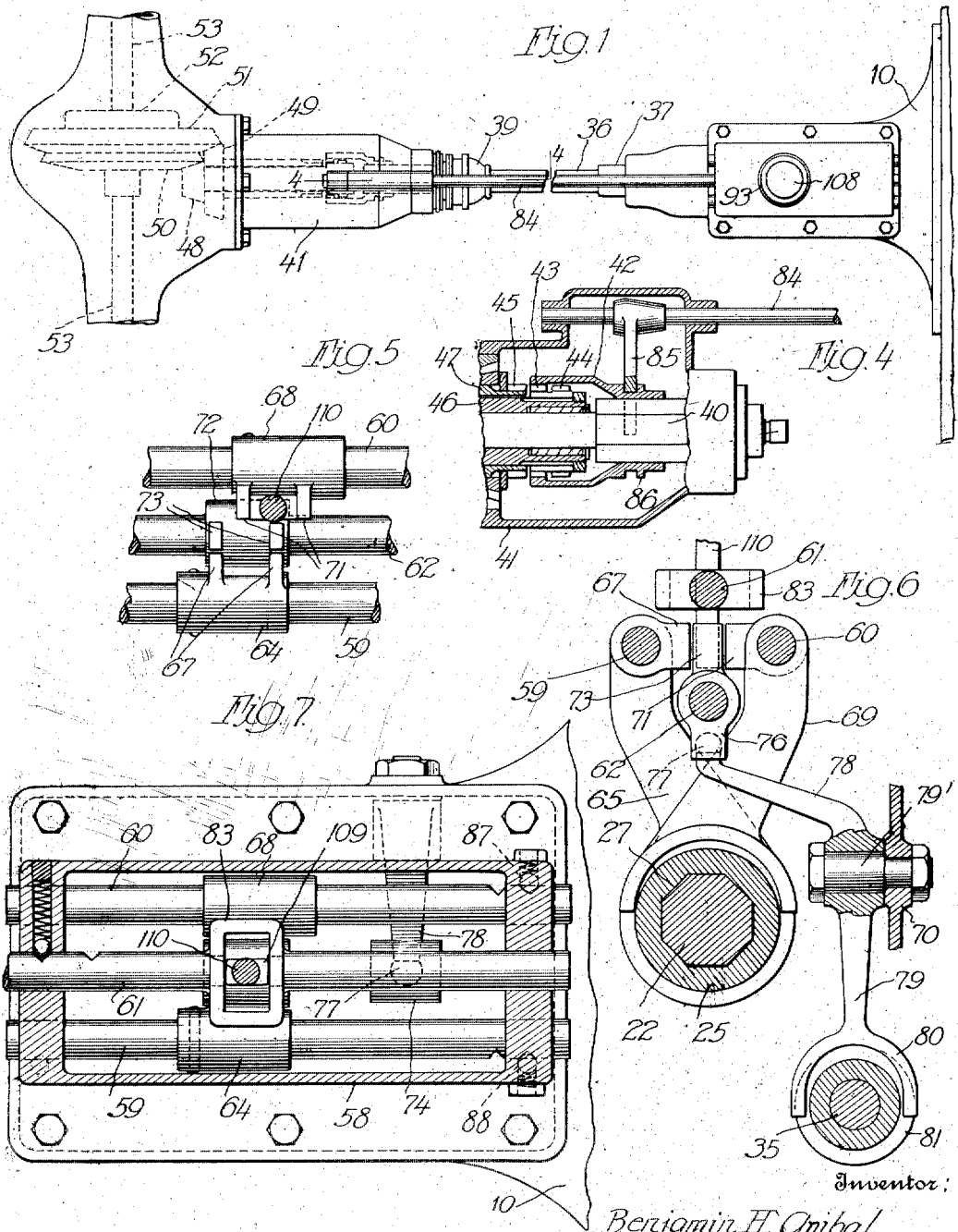

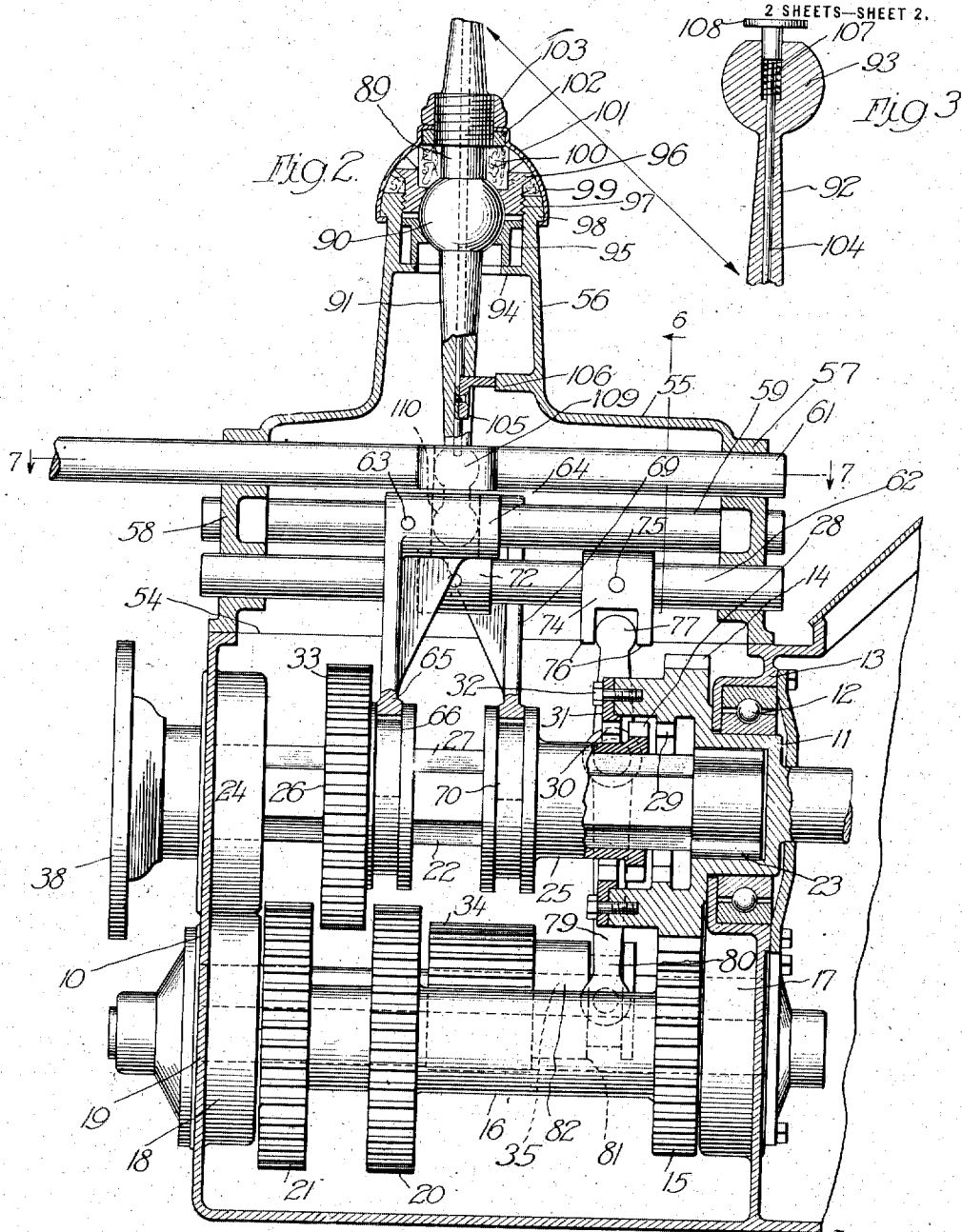

BENJAMIN H. ANIBAL, OF DETROIT, MICHIGAN, ASSIGNOR TO CADILLAC MOTOR CAR COMPANY, OF DETROIT, MICHIGAN, A CORPORATION OF MICHIGAN.

TRANSMISSION MECHANISM.

1,260,294.

Specification of Letters Patent.

Patented Mar. 26, 1918.

Application filed January 21, 1916. Serial No. 73,356.

*To all whom it may concern:*

Be it known that I, BENJAMIN H. ANIBAL, a citizen of the United States, and resident of Detroit, Wayne county, State of Michigan, have invented certain new and useful Improvements in Transmission Mechanism, of which the following is a specification.

This invention relates to motor vehicles, and particularly to transmission mechanisms especially adapted for use in such vehicles, although this invention may be used in various other locations where similar operating conditions are desired.

In the usual construction embodied in the modern motor car, equipped with a shaft drive, the motor is adapted to be connected with the live rear axle through a single line of shafting having a bevel pinion adjacent to the rear axle, and this pinion is normally in mesh with a bevel gear arranged on the usual housing for the differential gear on the axle. This simple transmission system is termed a "direct drive," and is, in fact, as direct a connection as can be obtained between the motor and the wheels, when the motor shaft is longitudinal of the vehicle, since the power is transferred to the axle through a single set of two meshing gears having a proper ratio. It is sometimes desirable to provide an axle having another set of bevel gears, having a higher ratio than the usual set, thus permitting higher speed of the car for a given speed of the motor. Of course the car is driven through this high direct drive set only under very favorable conditions. And it will be understood that in many cases it is desirable to use, in addition to this direct connection between motor and axle, a reduction gearing which will result in the axle being driven much slower than the motor with an increased torque. This reduction gearing is generally placed between the motor and the bevel pinions, above referred to; therefore, one of the objects of this invention is to provide a simple and efficient transmission control mechanism, especially adapted for use in connection with transmissions, such as previously described.

Another object is to provide a single lever control mechanism for a transmission mechanism, comprising a change speed gear box combined with a multiple direct drive axle, such as is obtained through pairs of bevel gears.

These and other objects will appear from the following description, taken in connection with the accompanying drawings, which form a part of this specification, and in which:

Figure 1 is a diagrammatic plan view of a combined multiple direct drive axle and reduction gear box;

Fig. 2 is a vertical longitudinal section of a change speed gear box embodying a preferred form of my invention;

Fig. 3 is a fragmentary longitudinal section through the upper part of the control lever, illustrated in Fig. 2;

Fig. 4 is a fragmentary longitudinal vertical section through the front end of the axle, illustrated in Fig. 1, substantially on the line 4—4 thereof;

Fig. 5 is a fragmentary plan view of a shifting mechanism, illustrated in Fig. 2;

Fig. 6 is a transverse vertical section through the shifting mechanism, substantially on the line 6—6 of Fig. 2; and Fig. 7 is a transverse section through the gear box, substantially on the line 7—7 of Fig. 2.

Referring to the drawings, 10 illustrates a transmission gear box, in which a driving shaft 11 is adapted to be mounted in bearings 12 arranged in the forward end 13 of the box. A gear 14 is shown as formed integral with the drive shaft, and is in constant mesh with a gear 15 arranged on a shaft 16, suitably mounted adjacent its front and rear ends, in bearings 17 and 18, in the front and rear ends 13 and 19 of the gear box. A pair of gears 20 and 21, which may or may not be of the same size, as will be hereinafter pointed out, are also suitably secured to the countershaft 16. A third, or driven shaft 22, is supported at its forward end in a bearing 23, arranged in the interior of the shaft 11. Its rear end may be mounted in a bearing 24 arranged in the rear end 19 of the gear box. A plurality of shiftable driving or gear elements 25 and 26 may be mounted on the fluted portion 27 of the driven shaft 22. Element 25 is provided with an external clutch 28, which is adapted to alternately mesh with the internal clutch teeth 29 formed integral with the gear 14, or with the internal gear 30 formed in the member 31, which is adapted to be secured to the gear 14, as by bolts 32. By meshing the clutch member 28 with either of the internal clutch members, a direct drive connection may be obtained from the driving shaft 11 to the driven shaft 22, and an indirect connection may be formed between these two shafts by shifting the gear 33 formed on the member 26 either forwardly into mesh with the gear 20 or rearwardly into mesh with the gear 21, both arranged on the countershaft 16. An idler gear 34 may be mounted on a supporting shaft 35 arranged in the crank case, and is adapted to be shifted in a manner which will be more particularly described hereinafter, rearwardly so that the gears 20 and 26 are connected together through the idler 34, when the gear element 26 is in the position shown in Fig. 2.

An intermediate, or propeller shaft 36, may be connected at its forward end through universal joint 37, of any well known form, to the rear end 38 of the driven shaft, and may have its rear end connected through a similar universal joint 39 to the fluted tail shaft 40, which may be suitably mounted in the forwardly extending housing 41 of the rear axle. A clutch member 42 may be shiftably mounted on the tail shaft 40, and provided with internal teeth 43, which may be alternately brought into mesh with the external teeth 44 or 45, formed or arranged on the front end of the pinion shafts 46 and 47, respectively. A pair of driving pinions 48 and 49 may be arranged on the ends of these pinion shafts, as shown in dotted lines in Fig. 1, and adapted to mesh with similarly shown gears 50 and 51, arranged on the differential housing 52 of the rear axle driving sections or driven shafts 53.

Arranged over an opening 54, formed in the upper part of the gear case 10 is a cover 55, provided with a pedestal 56. Suitably arranged in the end walls 57 and 58 of the cover are four longitudinally shiftable supporting rods 59, 60, 61 and 62, respectively. Sleeved on the rod 59, and secured thereto, as by a pin 63, is a shifting member 64 having a downwardly extending fork 65 embracing the collar 66 on the shifting member 26. The member 64 is also provided with a pair of spaced lugs 67 for shifting the same, as will be more particularly pointed out hereinafter. A similar shifting member 68 is mounted on the shaft 60 and is provided with a downwardly extending fork 69, which is adapted to embrace the collar 70 of the shifting member 25. The shifting member 68 is also provided with laterally extending lugs 71. Another shifting member 72, provided with upwardly extending lugs 73 is fixed on the rod 62. Another shifting member 74 is also fixed on the rod 62, as by a pin 75, and is provided with downwardly extending lugs 76, between which is arranged an upwardly extending ball portion 77 on a bell crank 78, which is pivoted, as at 79', to the side wall of the case 10. Its downwardly extending arm 79 is provided with a fork 80, which is adapted to embrace a collar 81 formed on an idler shifting element 82.

The rod 61 is formed intermediate its ends with a slotted portion 83, and is adapted to be flexibly connected, in any well known manner, with a shaft 84 mounted in the casing 41 of the rear axle, which has fixed thereon a shifter fork 85, adapted to embrace a collar 86 formed on the shifting element 42. It will be understood that suitable spring plungers, such as illustrated at 87 and 88, may be provided for preventing movement of the various shifting rods 59, 60, 61 and 62. Mounted in the pedestal 56 is a single operating lever 89, provided with a ball portion 90, a downwardly extending arm 91, and an upwardly extending arm 92, provided at its end with a handle ball member 93. The pedestal 56 is provided with an inwardly extending flange 94, in which may be arranged a socket member 95 for supporting the ball portion 90 of the shifting lever. A socket member 96 is adapted to be secured, as by means of threads 97, to the neck 98 of the pedestal. Felt rings 99 and 100, and a dust cap 101 are held in position, as by means of nuts 102 and 103, forming an oil tight cover, while at the same time permitting the shifting lever to be swung in all directions.

It will be noted that the shifting lever 91 is drilled out throughout its length, for the insertion of a rod 104, to the lower end of which is secured a locking latch 105, which is adapted to abut against the lug 106, when the lever is in a substantially vertical position. The latch is held in this position by means of a spring 107 arranged in the ball handle 93, and the upper end of the rod 104 is provided with a release button 108. The lower end of the shifting arm 91 is formed with a finger 109, which is adapted to shift the rod 61 whenever the lower end of the shifting lever is moved in a forwardly or rearwardly direction. The lower end of the shifting lever is also provided with a ball member, or finger 110, which is adapted to be inserted between the lugs, 67, 71 or 73 for shifting the same.

Having thus described the general construction and arrangement of the parts involved, it will be understood, that assuming the various shifting elements to be in the position shown in Figs. 2 and 4, which are in their respective neutral positions; the shifting lever may be swung to pick up any one of the shifting members 64, 68, or 72. If the shifting lever is left in its substantial vertical position, its upper end may be shifted forwardly without moving any of the gears into mesh; on the other hand, it may not be shifted rearwardly without depressing the release button 108. If, however, this button is released, and the upper part of the lever is thrown rearwardly, it will simulta- neously cause the rod 61 and its shifting element 42 to be thrown forwardly and the rod 84 and its shifting element 82 to be thrown rearwardly, thus bringing the gears 20 and 33 into mesh through the idler 34 and forming reverse gear drive connections through the outer pinion and gear 49 and 51, respectively. Now, assuming the parts to be brought back to their respective neutral positions; if the upper end of the shifting lever is thrown toward the left side of the vehicle, its finger 110 will be thrown between the lugs 67 of the shifting member 64, and if the upper end of the member is then thrown rearwardly, the gear 33 will be thrown forwardly into mesh with the gear 20, which may provide a total reduction from the driving shaft 11 to the driven shaft 38 of about three to one. When the shifting lever is thrown in the position just described, it will, at the same time carry the shift element 42 on the rear axle forwardly, bringing the teeth 43 and 44 into mesh, thus forming a drive from the driven member 38 to the rear axle, through the low direct drive set, comprising pinion 48 and gear 50, which may have a ratio of about five to one, giving a total reduction of about fifteen to one from driving shaft to the axle proper. If the shifting lever is then thrown in an opposite direction, assuming the reduction between gears 33 and 21 to be the same as that between 33 and 20, and the direct drive gears 49 and 51 to provide a reduction of three to one, a total reduction between the motor driving shaft 11 and the axle proper 53, of nine to one is obtained; of course a greater reduction between the gears 33 and 21 than between gears 33 and 20 may be provided, if desired.

Now, if the shifting lever is brought back to neutral position, and its upper end is thrown to the right side of the vehicle, the finger 110 at its lower end will pick up the shifting member 68 on the rod 60, and by then throwing the upper end of the shifting lever rearwardly, the shifting element 42 on the rear axle is thrown forwardly, while the shifting element 25 is also thrown in the same direction, resulting in a direct drive connection through the driving shaft 11, clutch teeth 28 and 29, driven shaft 38, intermediate shaft 36, clutch teeth 43 and 44, pinion shaft 46 and inner direct drive set 48 and 50 to the axle 53, the total reduction being only five to one; on the other hand, if the upper end of the shifting lever is thrown forwardly, the driving and driven shaft will also be connected directly and the shifting element 42 will be thrown rearwardly, bringing the teeth 43 and 45 into mesh, so that the drive is through the outer direct drive set 49 and 51, thus giving a total reduction of only three to one.

While I have shown and described in detail a separate transmission gear box and axle, it will be understood that these two units may be combined, if desired, and while I have described what I deem to be a preferred embodiment, it will, of course, be clearly understood that various modifications and changes in the construction and operation of the various devices may be made, by one skilled in the art, without departing from the spirit and scope thereof.

Having thus described my invention, what I claim and desire to secure by Letters Patent is:

1. In a transmission mechanism, the combination with a plurality of shiftable change speed elements, a pair of which are adapted to be selectively shifted, and another of which is adapted to be shifted with each shift movement of one of the other of said elements.

2. In a transmission mechanism, the combination with a gear set, comprising a shiftable change speed element, and an axle comprising a shiftable element for obtaining a plurality of direct connections, of means for shifting said elements by the same movement.

3. In a transmission mechanism, the combination with a gear set, comprising a shiftable change speed element, and an axle comprising a shiftable element for obtaining a plurality of direct connections, of means for simultaneously shifting said elements.

4. In a transmission mechanism, the combination with a gear set, comprising a plurality of independent shiftable change speed elements, and an axle comprising a shiftable element for obtaining a plurality of direct connections, of common means for simultaneously shifting one of independent said elements with said latter element.

5. In a transmission mechanism, the combination with a gear set, comprising a shiftable change speed element, and an axle comprising a shiftable element for obtaining a plurality of direct connections, of means comprising a single lever for shifting said elements by the same movement.

6. In a transmission mechanism, the combination of a driving member, a driven member, a plurality of gears thereon, pinions adapted to mesh with said gears, means comprising reduction gearing, provided with a shiftable element and another shiftable element for connecting said driving and driven members directly through any of said sets of gears and pinions, or for connecting them through said reduction gearing, thereby driving said sets of gears and pinions at a reduced speed, and a lever adapted to shift both of said elements by one movement 7. In a transmission mechanism, the combination of a driving member, a driven member, a plurality of gears thereon, pinions adapted to mesh with said gears, means comprising reduction gearing, provided with a shiftable element and another shiftable element for connecting said driving and driven members directly through any of said sets of gears and pinions, or for connecting them through said reduction gearing, thereby driving said sets of gears and pinions at a reduced speed, and means for simultaneously shifting said elements.

8. In a transmission mechanism, the combination of a driving member, a driven member, a plurality of gears thereon, pinions adapted to mesh with said gears, means comprising reduction gearing, provided with a shiftable element and another shiftable element for connecting said driving and driven members directly through any of said sets of gears and pinions, or for connecting them through said reduction gearing, thereby driving said sets of gears and pinions at a reduced speed, and means comprising a single lever for shifting said elements by one movement.

9. In a transmission mechanism, the combination of a driving member, a driven member, gears thereon, pinions engaging each of said gears, means including reduction gearing, and a plurality of shifting gear elements for directly connecting said driving and driven members through any of said gears selectively or for indirectly connecting said members through any of said gears selectively and reduction gearing, and common means for simultaneously shifting said elements.

10. In a transmission mechanism, the combination of a driving member, two driven gears, pinions engaging each of said gears, means including change speed gearing and a plurality of shifting gear elements for connecting either of the pinions directly, or for impelling said pinions selectively from the driving member at lower relative speeds, and common means for simultaneously shifting said elements.

11. In a transmssion mechanism, the combination of a driving member, two driven gears, a pinion engaging each of said gears, each of said pinion and gear combinations having a different ratio, means including change speed gearing and a plurality of shifting gear elements for connecting either of the pinions directly, or for impelling said pinions selectively from the driving member at lower relative speeds, and common means for simultaneously shifting said elements.

12. In a transmission mechanism, the combination of a driving member, two bevel gears of different diameters, a pinion engaging each of said gears, and means including change speed gearing and a plurality of shiftable gear elements for connecting either of the pinions directly, or for impelling said pinions selectively from the driving member at lower relative speeds, and interconnected means for simultaneously shifting said elements.

13. In a transmission mechanism, the combination of a driving member, two bevel gears of different diameters, a pinion engaging each of said gears, and means including change speed gearing and a plurality of shiftable gear elements for connecting either of the pinions directly, or for impelling said pinions selectively from the driving member at lower relative speeds, and common means interconnected for simultaneously shifting said elements.

14. In a transmission gearing, the combination of a driving member, two bevel pinions, coaxial bevel gears engaging said pinions on the same side, means including change speed gearing and a plurality of shiftable gear elements for connecting either of the pinions directly, or for impelling said pinions selectively from the driving member at lower relative speeds, and means for simultaneously shifting said elements.

15. In a transmission mechanism, the combination with a driving member, a driven member, a plurality of gears thereon, a plurality of pinions adapted to mesh with said gears, reduction gearing comprising a plurality of shiftable gear change elements, an intermediate member, a shiftable element adapted to connect said intermediate member selectively with either of said pinions, and interconnected means for shifting said latter element and either of said former elements whereby said driven member may be driven from said driving member selectively through single pairs of gears or through reduction gearing between said driving member and said intermediate member.

16. In a transmission mechanism, the combination with a driving shaft, an intermediate shaft, a countershaft, said countershaft being adapted to be constantly driven from one of said shafts, and means comprising a shiftable gear change element for selectively connecting said countershaft with said other shaft by reduction gearing, or for directly connecting said driving and driven shafts, of an axle shaft, a pair of gears on said axle shaft, pinions in mesh with said gears, connections between said axle shaft and said intermediate shaft comprising a shiftable element, adapted to selectively drive said pinions, and interconnected means for shifting said latter element and said former element.

In testimony whereof I affix my signature.

BENJAMIN H. ANIBAL.